United States Patent [19]

Arnold et al.

[11] 4,191,913
[45] Mar. 4, 1980

[54] SAFETY INTERLOCK CIRCUIT FOR AN ERROR-SIGNAL-CONTROLLED SERVO SYSTEM

[75] Inventors: Winfried Arnold, Vaihingen, Enz; Hans Kubach, Korntal-Münchingen, both of Fed. Rep. of Germany

[73] Assignee: Robert Bosch GmbH, Stuttgart, Fed. Rep. of Germany

[21] Appl. No.: 857,889

[22] Filed: Dec. 6, 1977

[30] Foreign Application Priority Data

Dec. 9, 1976 [DE] Fed. Rep. of Germany ....... 2655906

[51] Int. Cl.² ................................................ G05B 9/02
[52] U.S. Cl. ................................... 318/563; 318/565; 318/663; 318/678
[58] Field of Search ................. 318/563, 565, 663, 678

[56] References Cited

U.S. PATENT DOCUMENTS

| | | | |
|---|---|---|---|
| 3,578,871 | 5/1971 | Sakamoto | 318/563 X |
| 4,030,012 | 6/1977 | Buhler | 318/565 |
| 4,037,519 | 7/1977 | Miller et al. | 318/663 X |
| 4,078,750 | 3/1978 | Tomlinson | 318/563 X |

Primary Examiner—Benjamin Dobeck
Attorney, Agent, or Firm—Frishauf, Holtz, Goodman & Woodward

[57] ABSTRACT

In a servo system for manipulating a displaceble member in response to movement of a control through corresponding changes of position, which operates by comparing an electrical signal representative of the position of the control with an electrical signal representative of the position of the displaceable member to provide error signals which can drive the displaceable member in either of two opposite directions, a safety interlock circuit is provided which detects the presence of an error signal in either direction immediately after the application of operating voltage or immediately after the switching of the machinery into a different mode of operation and locks the displaceable member in position if an error signal initially appears until the error signal is cancelled by bringing the manual control into a position corresponding with that of the displaceable member. Unexpected sudden movements that may endanger personnel are thereby prevented. The invention is illustrated with reference to mobile agricultural machinery.

19 Claims, 5 Drawing Figures

SAFETY INTERLOCK CIRCUIT FOR AN ERROR-SIGNAL-CONTROLLED SERVO SYSTEM

This invention relates to a safety interlock circuit for use in a servo system that controls one or more displaceable members of considerable size as such are used in agricultural earth-working machinery, other earth-moving machinery and the like. In such heavy machinery, a movement of a displaceable tool or support member that is subject to heavy mechanical loading is usually controlled by a hydraulic cylinder operating on a piston or by a screw jack or some similar means for mechanically developing large forces to establish or hold a positioning adjustment. The servo system has an output which controls the application, removal and direction of the drive of the hydraulic or screw member, and the application, removal and direction of drive is controlled thereby with reference to the comparison of the position of a manual command control with the position of the displaceable member under control, the comparison usually being accomplished by the comparison of electrical signals respectively representing the positions to be compared. Thus, in summary, a command signal value or setting value is compared with an actual position signal value or feedback signal value in order to produce an error signal which, at least in the case in which the error signal exceeds a certain very small threshold value, causes the drive to operate in the direction expected to reduce the error signal. The system is either at rest or in balance when the error signal is zero (or less than some small threshold value in either direction from zero).

It is particularly important in systems of this type exerting large forces wielding sizeable or massive members that the displaceable members should not be capable of executing any movements that are, so to say, uncontrolled. Such uncontrolled movements can take place, for instance, if the driving power of the device should fail for a short interval and interrupt movement of a displaceable member in midpath wherever it happens to be. If the driving power reappears, the operating movement will not start from the balanced or idle position of the servo system, but from a position that was taken by the apparatus upon the failure of the drive energy. A corresponding situation occurs when the apparatus is switched off in the middle of a movement and then is switched on again at a later time, even if the manual control is not shifted in position during the de-energized period. It is necessary in each case to re-start the movement operation out of the balanced condition of the servo system in order to avoid endangering persons working with the machine or standing by for some other reason.

For this reason, safety interlocks are known for machine tools, that have the form of a device to block restarting. Upon failure of the electric power supply, a protective device drops down to prevent the machine from itself restarting when the electric power is restored. Safety interlock circuits are also known for devices having cyclic operating processes, in this case the safety circuit having the effect that when the drive power is restored, the work cycle previously begun is brought to an end and the equipment is then turned off.

Of particular significance are interlock circuits for vehicles equipped with lifting machinery. Thus, hydraulic stacker trucks are known in which buttons are respectively provided for control of the lifting and lowering operations. In this case, the lifting equipment performs a movement only if the up or down button is actuated. If the drive energy fails either during operation or during quiescence of the lifting device, or when the main switch of the entire equipment is open, the lifting device holds firmly in whatever position it had on such an event and continues to do so after the supply power is restored or the main switch is reclosed.

There is a disadvantage in such control systems that no defined value can be prescribed for the displacement of the movable tool and the latter must rather be brought into the desired position by manipulation of the raising and lowering contacts. In a few applications, particularly in the case of agricultural machinery, it is desired, however, to be able to preset the extended or displaced position of the power control tool at a defined value. Thus, as a rule, a plow mounted on a tractor or powered trailer is operated in a particular position, is lifted at the end of the furrow during the turning around of the equipment and then is put back into its previous position for further operation. In such a case, it would be undesirable to have to set again the position of the plow each time by actuation of an up and down control by operating up and down contacts.

Servo systems of the kind mentioned above by way of introduction have therefore become known in which the position of the displaceable member is converted into an electrical signal and is compared with a prescribed or commanded reference value. Servo control systems are known for responding to the resulting error signal to cause the actual position of the displaceable member to correspond to the commanded position. In such a system, however, for safety reasons it must still be brought about that when there is a difference between commanded and actual position when the device is switched into operation, the displaceable element will not automatically be shifted to the commanded position. If, as in the case of the hydraulically controlled plow, the height of the lifting arm should be set by a lever, it can happen that after switching off the machinery, the lever can be shifted, so that when it is switched on again there will be a difference between the actual height of the lifting arm and the commanded height. Without a suitable safety circuit, the lifting equipment will automatically be driven to the position that corresponds to the lever position. Since this involves substantial risks, it is important to provide a safety interlock circuit to prevent such uncontrolled displacement of the movable member upon starting up of the equipment. It is an object of the present invention to provide a safety interlock system for that purpose that is simple and reliable in operation, further, one that can be used to provide further operating advantages.

THE PRESENT INVENTION

Briefly, an interlock circuit is provided for locking the displaceable member in position after the turning on of the servo control system if, and for so long as, there is a difference in magnitude between the value of an electrical signal representative of the position of the displaceable member and the value of an electrical signal representative of the position of a manual positioning control, at least in the case where such difference exceeds a low threshold value. Then, in the event there is such a difference when the system is switched on and the interlock system operates to hold the displaceable member in position, and thereafter the difference in signals disappears, the reappearance of a difference in these signals will have the normal effect of operating the servo system and the interlock system will not be brought into play again until the system is turned off or cut off again, except possibly for special features that may be additionally provided.

Thus, the interlock system of the invention operates to lock up the mechanical movement against displacement upon starting up when there is an initial difference between command signal and feedback signal. In a preferred form of the invention, the locked mechanical movement can be unlocked only by readjusting the command signal to the actual value signal. In this manner, it is possible to operate the servo control and displacement system by means of a lever the displacement of which corresponds to the displacement which the controlled displaceable member is to assume, without impairing the safety of the device by the risk of uncontrolled movements upon turning it on.

In a preferred embodiment of the invention, means are provided to derive from the difference between command position signal and actual position signal the resulting electrical signal that will have a fixed predetermined magnitude and polarity independent of the sense (algebraic sign) of the difference. This signal is further processed in the electronic interlock circuit in such a way that upon switching on the supply voltage with an initial difference signal value "0" the servo system is released, whereas upon switching on the supply voltage with an initial difference signal value "1", the servo system is locked. Only if the command signal value is adjusted to the actual position signal value, so that the interlock control signal takes the value "0", will the servo system be unlocked, after which any subsequent "1" signal values of the interlock control signals do not lead to renewed locking of the servo system.

The safety interlock circuit of the invention can be utilized to particularly great advantage in agricultural vehicles provided with a lifting movement, for example tractors in which the height of the lifting mechanism to which agricultural devices such as plows, sowing drills and the like, can be attached, is set by a lever. Additional control circuits can be utilized in which the device attached to the lifting mechanism can be regulated on the basis of constant pulling force or constant position or a definite combination of these magnitudes, or some mix of corresponding signals. Such a mode of operation can be designated as "automatic". In a mobile machine of that type, if the machine is to be moved with the agricultural tool not in operating position, as for example in transports from one work location to another, a mode of operation that may be designated "travel" or "transport" is utilized, in which the lifting mechanism is automatically set for maximum height when the mobile machine is driven in that mode. The servo system of the lifting mechanism remains switched in during this mode of operation, in order to assure keeping the lifting mechanism in position for maximum upward displacement of the tool and thus to compensate for any possible effects of mechanical shaking or leakage of oil from the hydraulic system of the lifting mechanism. In that case, the form of safety interlock described briefly above would not come into operation if when the new work place of the mobile machine is reached, the mode of operation is switched from "travel" to "automatic", while the height control lever is located in a position other than the one corresponding to the maximum upward displacement, since the operating mechanism as a whole has been supplied with operating voltage all along and the safety interlock system, as above described, comes into operation only for the case when the supply voltage is switched on. In a further elaboration of the invention, therefore, the mode selection switch provided in the operating control of the machine is provided with an additional contact so connected that when the operating mode is switched from "travel" to "automatic" the safety interlock system will be brought into action to lock the movement unless and until the height control lever is in a position corresponding with the actual position of the displaceable member that it controls.

Finally, in still another form of the invention an override switch is provided to unlock the safety interlock circuit of the system without regard to the normal inputs of the circuit. In that manner, it is possible, on the occasion of installation, adjustment or maintenance work, to actuate the displacement mechanism by hand.

The invention also has some detailed aspects involving particular circuit features that have been found effective and economical, but the pointing out of such features is better deferred until after the provision of circuit descriptions with reference to drawings.

Drawings, illustrating examples:

Figure 1:
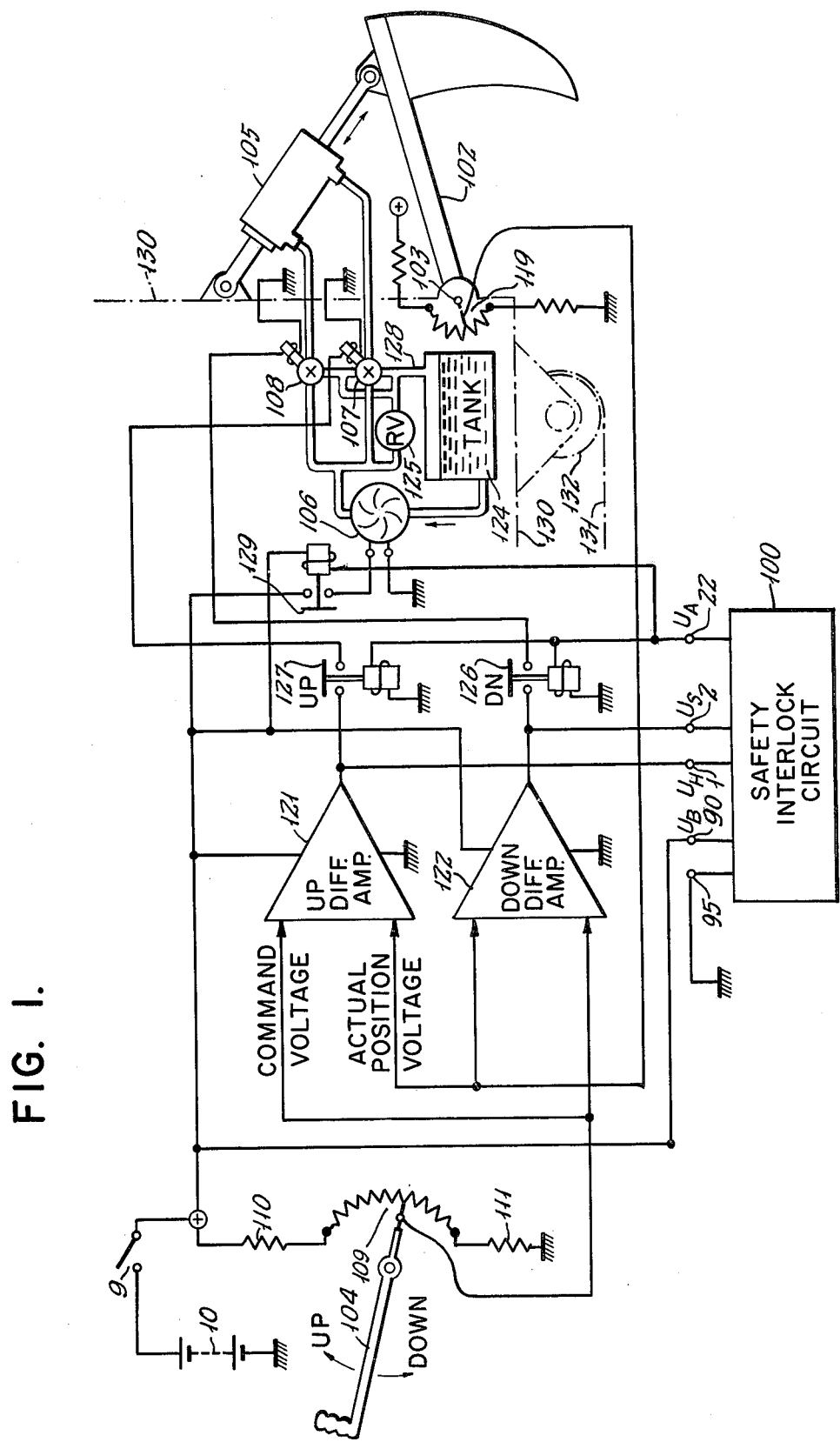
FIG. 1 is a diagrammatic representation of the basic elements of a servo system of an agricultural machine illustrating how it can be equipped with a safety interlock circuit according to the invention.

FIG. 1 illustrates how a safety interlock circuit 100 according to the invention typically fits into a servo system for actuating the swinging arm 102 about a horizontal axis 103 in movement conforming to the movement of the control lever 104. The arm 102 is controllably raised and lowered by means of the hydraulic cylinder 105 to which hydraulic fluid is pumped by a pump 106 through magnetic control valves 107 and 108.

Of course, many kinds of servo systems and drives operated thereby are known and the one illustrated in FIG. 1 is merely an example for showing the context in which the safety interlock circuit of the invention is usable. Screw drives powered by electric motors, for instance, could be used instead of the hydraulic drive illustrated and could be controlled to provide similar movements and likewise interconnected with a safety interlock circuit according to the invention. It will be evident that still other kinds of servo drives can similarly utilize safety interlock circuits according to the invention.

In the illustrated case, the control lever 104 serves to produce an electrical signal corresponding to the position of the control lever by means of a simple potentiometer 109, the movable contact of which is carried either on an end of the control lever 104 or on an arm that is rotated by it. Resistances 110 and 111 reduce the range of the control voltage to a range that can be easily handled by differential amplifiers utilizing the power supply battery 10 for their energization. The position of the machine arm 102 is similarly converted into an electrical signal by the potential 119 which, like the potentiometer 109, is supplied with energizing voltage through the main switch 9. FIG. 1 illustrates a system operating on comparison of dc voltages for turning on up or down drives, but of course other methods of electrical signal comparison are known, for example frequency modulation and FM detection systems in which another parameter of value of electrical signals is the basis of signal comparison, and the invention is also applicable to such signals.

The servo system shown in FIG. 1 operates by comparison of the command voltage signals produced by the potentiometer 109 with the actual position voltage signals produced by the potentiometer 119. As illustrated, the comparison is made both in the differential amplifier 121 to produce an up-drive signal and in the differential amplifier 122 to produce a down-drive signal. Of course, a single differential amplifier could be used with a set of detector circuits at its outputs respectively operating an up-drive, a hold condition and a down-drive, but the use of two differential amplifiers makes it easy to set the thresholds for the up and down drives and to allow an overlap in which the drive power will be used to stiffen the raising and lowering device to hold the arm 102 in position, which can be readily done with a hydraulic system.

The differential amplifiers 121 and 122 include the necessary power amplifier stages for directly driving the magnetic valves 107 and 108 respectively. The system of FIG. 1 is to be understood as operating to hold the arm 102 firmly in a steady position so long as no signal is provided to either the valve 107 or the valve 108. That can be performed if in the unoperated condition the valves 107 and 108 allow hydraulic fluid to be pumped to both sides of the cylinder 105 up to a pressure at which the relief valve 125 operates and allows fluid pumped by the pump 106 to return to the tank 127. When one of the valves 107 or 108 receives an electrical signal in its magnet winding from the corresponding differential amplifier, the armature of the valve cuts off the inflow of fluid towards the cylinder and opens up the way to the discharge pipe 128 leading to the tank 127. If desired, the effect can be made progressive depending upon the voltage difference detected by the differential amplifier in question (the other differential amplifier providing no signal since the difference is in a sense which puts all such variations between the signals in the range below the thresholds for producing an output). A system is preferred in which the differential amplifier has a switching type of output amplifier, so that as soon as the threshold is exceeded a substantially constant voltage output is provided. The latter type of operation is best if the valves 107 and 108 are quick-acting.

The safety interlock circuit 100 has an oupput terminal 22 which controls switches 126 and 127 acting as gates for the outputs of the differential amplifiers 121 and 122 respectively. These switches are shown as electromagnetic relays, but electronic gate circuits or other electronic switches could be used instead. When there is no output voltage $U_A$ at the terminal 22, neither differential amplifier can energize the corresponding magnetic valve and, as explained before, the arm 102 is locked in position by the operation of the hydraulic system. The hydraulic system is preferably equipped with a brake or mechanical lock (not shown) so that when the pump 106 stops operating and the fluid pressure in the hydraulic system disappears, the lifting device for the arm 102 will be mechanically locked in position. The safety interlock circuit as shown in FIG. 1 also interrupts the power supply to the pump 106 by a switch 129, thus making use of the mechanical lock so far as possible, but this would have the disadvantage of making the release of the hydraulic system slower because the pump has to run up to operating speed before the full operating pressure becomes available. The omission of the relay switch 129 would avoid this disadvantage.

As will be explained further in connection with the diagrams of the several embodiments of the invention described below, all that the safety interlock circuit needs in the way of inputs are: a signal $U_H$ at the terminal 1 indicating whether or not there is an output signal from the up differential amplifier 121; a signal $U_S$ at the terminal 2 indicating whether or not there is an output signal from the down differential amplifier 122; a signal $U_B$ at the terminal 90 indicating whether the voltage of the battery 10 has been switched into the circuit by the main switch 9 (and, as discussed in connection with the third embodiment below, a similar signal from a mode switch which could be connected to the same terminal 90 and, finally, a connection to chassis ground from the terminal 95.

It should be added with reference to FIG. 1 that in order to symbolize a vehicle-mounted machine, there are indicated symbolically by dot-dash lines in FIG. 1 the outline of a carriage body 130, a propelling track 131 and one of the wheels 132 about which the track 131 passes.

Figure 2:
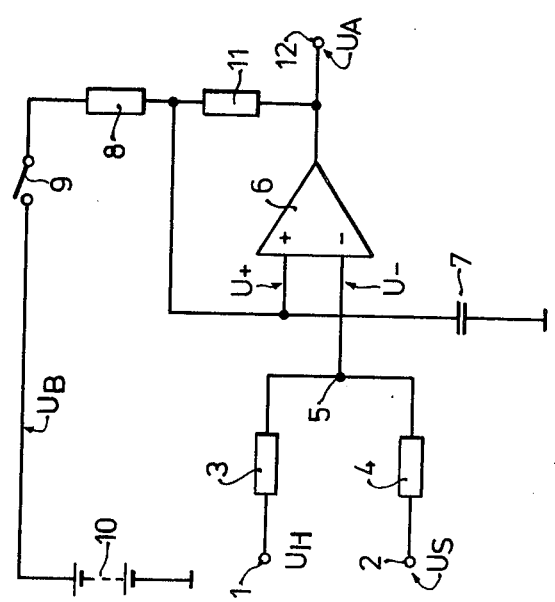
FIG. 2 is a basic diagram of one embodiment of a safety interlock circuit according to the invention.

FIG. 2 shows the basic block diagram of a first embodiment of a safety interlock circuit according to the invention. Input resistances 3 and 4 are interposed between the respective input terminals 1 and 2 and a common summing point 5 that is connected with the first input of a first comparator 6. The second input of the first comparator 4 is connected to chassis ground through a capacitor 7 and is also connected to the mid-tap of a voltage divider composed of resistances 8 and 11 which is connected between the output of the first comparator 6 and the main operating switch 9. The operating voltage $U_B$ can be applied to the circuit through the switch 9 from a battery 10. The output of the first comparator 6 is connected to an output terminal 12.

Operation of the first embodiment

Figure 3:
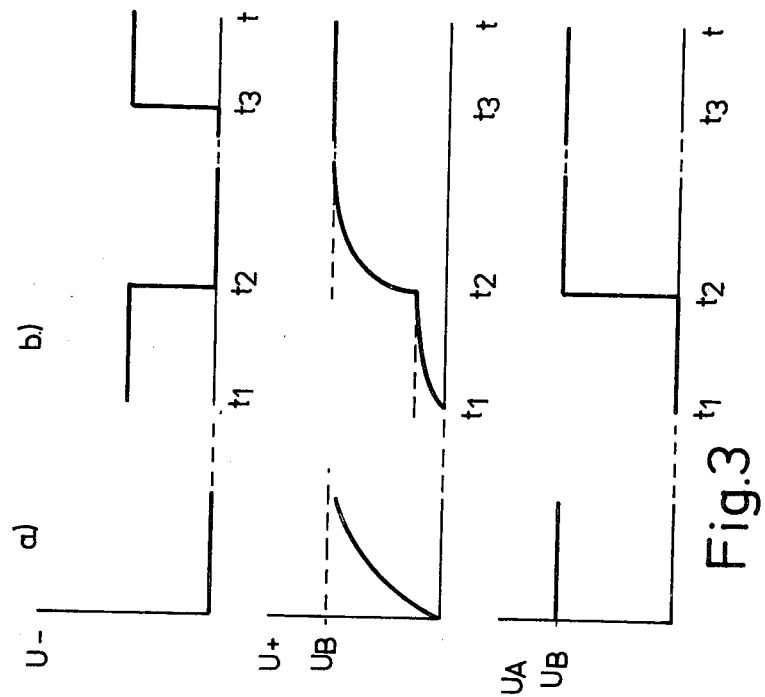
FIG. 3 is a timing diagram in the form of a graph illustrating the course of voltage at various points in the circuit of FIG. 2 under different conditions of the input magnitude.

FIG. 3 shows the course with time of the voltage $U_-$ that is applied to the first input of the first comparator 6, likewise the course of the second voltage $U_+$ that is applied to the second input of the first comparator 6 and, finally, the course of the voltage $U_A$ that is provided at the output terminal 12.

The voltage $U_H$, the up-drive voltage, is the signal that is applied to the displacing mechanism when the displaceable member is to be moved in the lifting direction. The voltage $U_H$ has a digital character, which means it takes on a certain positive voltage value when the displaceable member should be raised and has the value zero when no up-drive signal is provided. Similarly, at the input terminal 2 is applied a voltage $U_S$ that provides information concerning whether a down-drive signal is present or not. This means that at the summing point 5 there is always a voltage whenever the manually set command voltage does not correspond to the actual position voltage and a zero voltage is present at the summing point 5 when the command voltage and the actual position voltage are substantially equal. The voltage at the summing point 5 is designated in the drawings as $U_-$ and it is applied to the first input of the first comparator 6. In the lefthand portion of FIG. 3, it is assumed that the command voltage and the actual position voltage are substantially the same, so that the voltage $U_-$ is equal to zero. If this is the situation as soon as the switch 9 is closed to apply the operating voltage to the system, the capacitor 7 charges through the resistor 8 and a voltage rising exponentially to the value $U_B$ appears at the second input of the first comparator 6. The latter is therefore continuously continuously switched in the positive output condition and the voltage $U_A$ at the output terminal 12 at once takes on the value $U_B$. As already explained in connection with the illustrative system of FIG. 1, when there is a positive voltage at the output terminal 12, the mechanical displacing movement is set free to move and this corresponds to the fact situation in which $U_H=U_s=0$, which is to say that the command voltage is equal to the actual position voltage.

In the righthand portion of FIG. 3 (designated b) at the top of the figure, the situation is shown in which $U_-$ at the moment $t_1$ has a positive value. That signifies that a difference exists between the command voltage and the actual position voltage. This difference can arise either from the presence of $U_H$ (up-drive signal) or from the presence of $U_S$ (down-drive signal), it being unimportant in which direction a difference between command voltage and actual position voltage exists. If this is the situation as soon as voltage is applied to the circuit by closing the switch 9, the first comparator 6 is put in its zero output condition, because a higher voltage is applied to its inverting input than to its second and non-inverting input. This means that the capacitor can now charge up only to a voltage that corresponds to a fraction of the operating voltage $U_B$ determined by the values of the resistors 8 and 11. Under these conditions, the output voltage $U_A$ of the comparator remains at zero value and the displacement mechanism is locked. Only if and when the command voltage is brought into correspondence with the actual position voltage, i.e. when $U_H=U_S=0$ is established, both $U_-$ also become 0, so that the first comparator 6 will switch into the positive output condition, which is indicated as occurring at the moment $t_2$ in FIG. 3. A positive $U_A$ voltage will then be applied to the output terminal 12 and the displacement mechanism will be set free. When this happens, capacitor 7 can again charge up to the full supply voltage and a positive output condition of the first comparator 6 will continue even when at a later moment $t_3$ a deviation of the command voltage from the actual position voltage should then appear. The same cycles of operation would occur if the supply voltage for the potentiometers 109 and 119 should be derived from a separate source, instead of being supplied through the switch 9. It is assumed that when these voltages are supplied through the switch 9 along with the rest of the circuit, the applied voltage arrives essentially simultaneously to the two potentiometers.

Figure 4:
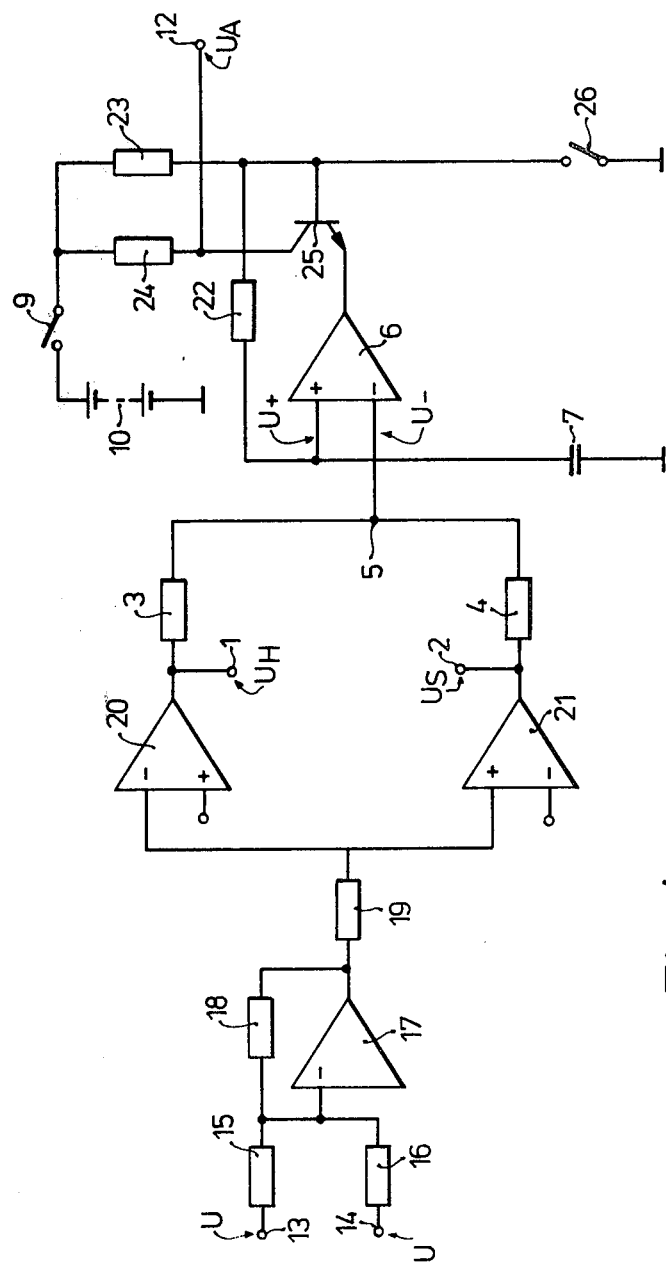
FIG. 4 is the basic diagram of a second embodiment of the safety interlock circuit of the invention.

FIG. 4 is a basic circuit diagram of a second embodiment of the safety interlock circuit of the invention. In this embodiment, the command voltage and the actual position voltage are supplied to terminals 13 and 14 of the safety interlock circuit, to which terminals resistances 15 and 16 are respectively connected, the other ends of which are both connected to the inverting input of an amplifier 17 which has a feedback connection through a resistance 18 connected between output and inverting input. The output of the amplifier 17 is connected through a resistance 19 to the inverting input of a second comparator 20 and to the non-inverting input of a third comparator 21. The outputs of the comparators 20 and 21 correspond to the input terminals 1 and 2 of the basic diagram shown in FIG. 1. In other words, the lefthand portion of FIG. 4 may replace the differential amplifiers 121 and 122 of FIG. 1 for comparing the command and actual position voltages to produce up-drive and down-drive signals.

In a manner similar to FIG. 1, the outputs of the comparators 20 and 21, corresponding in FIG. 4 respectively to the terminals 1 and 2 of FIG. 1, are connected respectively through resistances 3 and 4 to the summing point 5 which is again connected to the inverting input of the first comparator 6. The non-inverting input of the first comparator 6 is again connected through the capacitor 7 to ground, but in this case the other connection of the non-inverting input of the first comparator 6 is connected to a series combination of resistances 22 and 23, the other end of which is connected to the main switch 9, while the common connection of the resistances 22 and 23, constituting a tap of a voltage divider, is connected to the base of a transistor 25 which has its emitter connected to the output of the first comparator 6 and its collector connected through a load resistor 24 to the switch 9. There is also a connection from the collector of the transistor 25 to the output terminal 12. The base of the transistor 25, finally, is connected to a switch 26 that operates as a normally open switch and may be spring-loaded, to chassis ground.

Operation of the second embodiment

The command voltage applied to the terminal 13 can be obtained as in FIG. 1 from a potentiometer and, likewise, the actual position voltage for the terminal 14. The voltages are so provided that when the command and actual position voltages are the same, a zero voltage is present at the output of the amplifier 17 and when they are different, either a positive voltage or a negative voltage appears at the output of the amplifier 17. By suitable adjustment of the comparators 20 and 21, it can now be provided that a positive voltage appears at the summing point 5 when the output voltage of the amplifier 17 exceeds a certain positive value or when it lies below a certain negative value. If the output voltage of the amplifier 17 lies within a dead zone between these voltage values, a zero voltage appears at the summing point 5. In that case, as in the case illustrated in connection with FIG. 1, when the command and actual position voltages are the same, a zero voltage is present at the inverting input of the first comparator 6, whereas when there is a difference between command and actual position voltages in either direction, a positive voltage is present at the inverting input of the first comparator 6. If when the main switch 9 is closed the voltage $U_-$ at the inverting input of the first comparator 6 has the value zero, the capacitor 7 will charge through the resistors 22 and 23 to the supply voltage. The voltage at the base of the transistor 25 accordingly rises from a fraction of the supply voltage determined by the resistors 22 and 23 up to the full value of the supply voltage. Since the first comparator 6 is in the positive output condition, the transistor 25 remains unconducting and the voltage $U_A$ equal to the supply voltage $U_B$ can be taken from the output terminal 12, so that the displacement mechanism of the machine is set free. If there is a difference between command and actual position voltage, the voltage $U_-$ is positive and if this occurs when the main switch is closed, the comparator 6 goes directly into the zero voltage output condition. Since the voltage at the base of the transistor 25 still rises, the transistor 25 conducts and the voltage $U_A$ drops and quickly locks the displacement mechanism. If in spite of this automatic locked condition it should be desired to put the displacement mechanism into operation, for maintenance purposes for example, the base of the transistor 25 can be grounded through a switch 26. The transistor 25 then again becomes non-conducting and the voltage $U_A$ rises and sets free the displacement mechanism, even though the voltage $U_-$ has a positive value. The switch 26 can, accordingly, be regarded as a "manual override" for disabling the safety interlock circuit.

Figure 5:
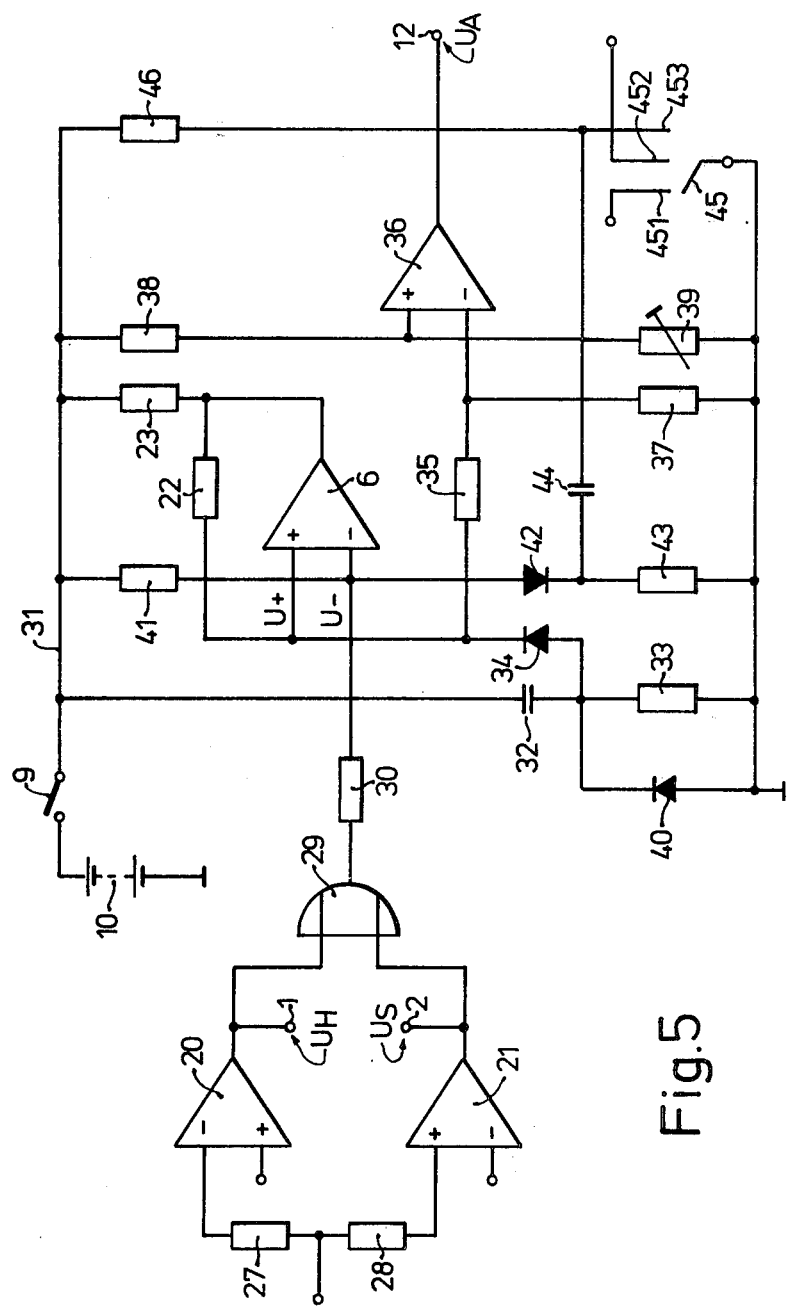
FIG. 5 is a basic diagram of a third embodiment of the safety interlock circuit of the invention.

FIG. 5 is a basic diagram of a third illustrative embodiment of a protective interlock circuit according to the invention. In this embodiment, the second and third comparators 20 and 21 again appear as in FIG. 4, but instead of the common input resistor 19 for both of these differential amplifiers, there are now separate input resistors 27 and 28 connected to the common input terminal which may be assumed for example, to be connected to the output of the amplifier 17 of FIG. 4. Furthermore, the outputs of the second and third comparators 20 and 21 are respectively connected to the inputs of a NOR-gate 29, the output of which is connected through a resistor 30 to the inverting input of the first comparator 6. These differences merely illustrate the variety of specific circuit arrangements available for providing the signal to the inverting input of the comparator 6.

The switch 9 again connects the voltage of the battery 10 to the circuit, in this case delivering a positive supply voltage to a supply voltage bus 31. Instead of the capacitor 7 of FIGS. 1 and 4 and its charging resistors, there are provided in the present case a capacitor 32 in series with a resistor 33, the capacitor side of the combination being connected to the switch 9 and the resistor 33 to ground, while a diode 34 is connected with its annode connected to the common connection of the capacitor 32 and the resistor 33, and its cathode at the non-inverting input of the first comparator 6. That input of the first comparator 6 is also connected through a series combination of resistors 22 and 23 to the voltage supply bus 31. In order to accelerate the discharge of the capacitor 32, the resistor 33 is bridged by a second diode 40.

The non-inverting input of the first comparator 6 and the cathode of the first diode 34 are connected through a resistance 35 to the inverting input of a fourth comparator 36 that has its non-inverting input connected to the tap of a voltage divider consisting of a fixed resistor connected to the voltage supply bus 31 and an adjustable resistor 39 connected to ground. The non-inverting input of the fourth comparator 36 is also connected to ground through a resistor 37.

The inverting input of the first comparator 6, in addition to its previously mentioned connection through the resistor 30 to the NOR-gate 29, is connected through a resistor 41 with the voltage supply bus 31 and through a conductively poled diode 42 to a resistor 43 the other end of which is grounded. From the cathode of the diode 42 which is connected to the resistor 43, there is connected a capacitor 44, the other terminal of which to the fixed contact 453 of a three-position selector switch 45 having a grounded selector arm by which one of its three fixed contacts 451, 452 and 453 can be selectively grounded. The switch contact 453 is also connected through a resistor 46 with the positive voltage supply bus 31. Finally, the output of the fourth comparator 36 is connected to the output terminal 12, at which the voltage $U_A$ can be obtained to lock or unlock the drive portion of the servo system as already discussed in other embodiments of the safety interlock circuit of the present invention.

Operation of the third embodiment

Since the output voltage of the comparators 20 and 21 are respectively connected to the inputs of the NOR-gate 29, a positive voltage can appear at the output of the NOR-gate 29 only if neither of the comparators 20 and 21 is providing an output signal. If either of the comparators 20 and 21 provides a signal, a zero voltage appears at the output of the NOR-gate 29.

If the voltage at the output of the NOR-gate 29 is zero when voltage is applied to the circuit through the closing of the main switch 9, a voltage is applied to the inverting input of the first comparator 6 that is determined essentially by the ratio of the resistors 30 and 41, so long as the value of the resistor 43, which is now in parallel with the resistor 41, is provided with a sufficiently high value. The voltage at the non-inverting input of the first comparator 6, is initially the full battery voltage because of the initial discharged condition of the capacitor 32, the diode 40 now being blocked, while the diode 34 conducts to apply the transient battery voltage value to the non-inverting input of the comparator 6. As the capacitor 32 charges, the voltage across the resistor 33 drops and the voltage at the non-inverting input of the comparator 6 likewise drops to a fraction of the battery voltage determined by the values of the resistors 23, 22, 35 and 37. By suitable selection of the values of these resistors and also of those of the voltage dividers consisting of the resistances 38 and 39, it can be provided that, in the case just mentioned, there will always be a higher voltage at the inverting input of the fourth comparator 36 than at the non-inverting input of that fourth comparator. In that way it is assured that the voltage $U_A$ at the output terminal 12 will be zero in the case just described and that the displacement mechanism of the servo system will remain locked.

If, on the other hand, when operating voltage is applied to the circuit by closing the switch 9 a positive voltage is produced or has already appeared at the output of the NOR-gate 29, the first comparator 6 immediately goes to its zero output switching condition. In this case the capacitor 32 charges through the diode 34 and the resistance 22, and the voltage at the non-inverting input of the first comparator 6 becomes zero. In this case the voltage at the non-inverting input of the fourth comparator 36 is greater than the voltage at its inverting input, so that the voltage $U_A$ at the output terminal 12 is positive and the displacement mechanism of the servo system is unlocked.

As already described in the previous reference to this third embodiment, this embodiment of the safety interlock circuit is designed to be installed in a farm tractor equipped with a controllable lifting mechanism that has one operating mode known as "travel" in which the lifting mechanism is raised to maximum height, while the servo system and also the safety interlock system still receive power supply voltage. If in such a case the mode of operation is switched from the "travel" mode to the "automatic" mode, the safety interlock would not come into operation without further circuit provisions. For this reason, an extra switch arm and elements are provided for the mode switching operation to constitute the mode switch 45, the selectable switch contact 451 of which is for the "off" condition, the contact 452 for the "travel" mode of operation and the contact 453 for the "automatic" mode of operation. In FIG. 5, only the contact 453 of the switch 45 is connected (for the purpose of the circuit, the other switch positions need not be provided with contacts). If the machine is operating in the "travel" mode, which is to say that the switch 45 is in the position 452, and then the machine is put into the "automatic" mode of operation, moving the switch 45 into the position 453, the inverting input of the first comparator 6 is grounded through the diode 42 and the capacitor 44. It is evident from the above-described mode of operation that this will cause the displacement drive of the servo system to be locked in position.

Of course, the safety interlock circuit in the various forms described is not limited in its application to installation in agricultural machinery and it can be applied to all kinds of servo systems where a sizeable or massive member is moved in response to the manipulation of a control that executes corresponding movements. This is for example the case in various lifting and feeding tools constituted as manipulators or industrial "robots" for handling heavy objects or members or for handling them remotely. Within the fields of application of the invention, it is evident that there will also be possibilities of variations and modifications of the illustrated embodiment within the inventive concept.

We claim:

1. An electronic safety interlock circuit for a servo system having at least one member arranged to be driven over a range of positions and movement in accordance with a command element having a corresponding range of positions, means for converting actual position of said member into an electrical value, means for converting a commanded position of said member into a corresponding electrical value, a control system for driving said member from its actual position to a commanded position by reference to comparison of said electrical values respectively produced by said converting means and a switch for putting said control system into and out of operation and further having the improvement which consists in that:

output disabling means are provided for preventing unexpectedly violent movement of said member following operation of said switch to put said system into operation, by holding said member locked in position, and thereby disabling the output effect of said servo system, from the time of operation of said switch for so long as an initial difference exceeding a predetermined small threshold magnitude and beginning substantially at the time of operation of said switch is present between said electrical values respectively produced by said converting means.

2. An electronic safety interlock circuit as defined in claim 1, in which said output disabling means are constituted so as to be released by shift of said commanded position so as to bring said electrical value corresponding thereto into substantial equality with said electrical value produced by said means for converting actual position of said member into an electrical value.

3. An electronic safety interlock circuit as defined in claim 2, in which means are provided responsive to a difference between said electrical values exceeding said predetermined magnitude for producing a first electrical voltage ($U_-$) having a substantially fixed predetermined magnitude, and said input disabling means include a first comparator (6) having its first input connected to the output of said means for producing said first electrical voltage ($U_-$) and having a delay circuit connected between a second input thereof and one side of said switch for receiving, at said second input of said first comparator, a rising voltage following the operation of said switch to put said servo system into operation.

4. An electronic safety interlock circuit for a servo system having at least one displaceable member, means for converting actual position of said member into an electrical value, means for converting a commanded position of said member into a corresponding electrical value, a control system for driving said member from its actual position to a commanded position by reference to comparison of said electrical values respectively produced by said converting means and a switch for putting said control system into and out of operation and further having the improvement which consists in that:

output disabling means are provided for locking said member in position upon operation of said switch to put said system into operation, said locking means being constituted so as to hold said member locked after said system is put into operation for so long as an initial difference exceeding a predetermined small threshold magnitude is present between said electrical values respectively produced by said converting means so as to be released by shift of said commanded position so as to bring said electrical value corresponding thereto into substantial equality with said electrical value produced by said means for converting actual position of said member into an electrical value;

means are provided responsive to a difference between said electrical values exceeding said predetermined magnitude for producing a first electrical voltage ($U_-$) having a substantially fixed predetermined magnitude;

said output disabling means include a first comparator (6) having its first input to the output of said means for producing said first electrical voltage ($U_-$) and having a second input provided with a delay circuit connected between a second input thereof and one side of said switch for receiving, at said second input of said first comparator, a rising voltage following the operation of said switch to put said servo system into operation; and a feedback resistance (11) is provided between the output of said first comparator (6) and said second input of said first comparator.

5. An electronic safety interlock circuit as defined in claim 4, in which the output of said first comparator (6) is interconnected with said control system so as to enable or disable, according to the value of said output, the driving of said member by said control system.

6. An electronic safety interlock circuit as defined in claim 5, in which said converting means are respectively constituted as electrical transducers and that the electrical voltages produced by them are supplied through respective input resistors (15,16) to an output of an amplifier (17).

7. An electronic safety interlock circuit as defined in claim 6, in which a second comparator (20) and a third comparator (21) are provided and in which the output of said amplifier (17) is connected through a resistance (19) with the inverting input of said second comparator (20) and with the noninverting input of said third comparator (21), and in which, further, the outputs of said second and third comparators are respectively connected through resistors (3,4) to said first input of said first comparator (6).

8. An electronic safety interlock circuit as defined in claim 3, in which said delay circuit includes a capacitor (7) connected between said second input of said first comparator (6) and ground or other reference voltage and also a series combination of resistances (22) and (23) interposed between said second input of said comparator (6) and said switch (9), said resistances providing a voltage divider.

9. An electronic safety interlock circuit as defined in claim 8, in which a transistor (25) is provided having its base electrode connected to the tap connection of said voltage divider (22,23), its emitter connected to the output of said first comparator (6) and its collector connected through a load resistance (24) to the same side of said switch (9) as said series combination of resistors constituting said voltage divider is connected.

10. An electronic safety interlock circuit as defined in claim 9, in which the collector of said transistor is connected to a point of said control system for enabling or disabling the driving of said member thereby.

11. An electronic safety interlock circuit as defined in claim 10, in which a switch is provided connected between said base of said transistor (25) and ground or other reference potential for releasing said locking means in spite of the presence of a difference between the respective electrical values provided by the respective converting means.

12. An electronic safety interlock circuit as defined in claim 3, in which there is provided an amplifier (17) having its input connected respectively through resistances (15,16) to the respective outputs of said converting means, and in which, further, in which a second comparator (20) and a third comparator (21) are provided and also a NOR-gate (29), and in which the output of said amplifier (17) is connected over a first resistance (27) with the inverting input of said second comparator (20) and over a second resistor (28) with the noninverting input of said third comparator (21), and in which the respective outputs of said second and third comparators are connected to the input of said NOR-gate (29), and in which the output of said NOR-gate (29) is connected through a resistance (30) to said first input of said first input of said first comparator (6) for application of said first voltage (U_) thereto, said second and third comparators, resistances and NOR-gates being included in said means for producing said first electrical voltage (U_).

13. An electronic safety interlock circuit as defined in claim 12, in which said delay means includes a capacitor (32) in series with a resistance (33) connected between said switch (9) and ground or other reference voltage, and in which, further, a diode (34) is connected between the common connection of said capacitor (32) and said resistance (33) in series therewith at one terminal of said diode and with said second input of said first comparator (6) at the other terminal of said diode, and in which, a series combination of resistances (22,23) is connected between said switch (9) and said second input of said first comparator (6) while the common connection of said resistances of said series combination is connected to the output of said comparator (6).

14. An electronic safety interlock circuit for a servo system as defined in claim 13, in which a fourth comparator (36) is provided having a first input connected through a resistance (35) with said first input of said first comparator (6), said first input of said fourth comparator also being connected through another resistance (37) to ground or other reference voltage, said fourth comparator (36) also having a second input connected to the tap of a voltage divider (38,39) formed of fixed and adjustable resistors and connected between said switch (9) and ground or other reference voltage, the output of said fourth comparator (36) being connected to said control system in such a way as to enable or disable driving of said member by said control system.

15. An electronic safety interlock circuit as defined in claim 14, in which a second diode (40) is provided for bridging said resistance (33) of said series combination of said resistance (33) and said capacitor (32) being so poled that unlike electrodes of said second diode and of said previously mentioned diode, connected to the common connection of said capacitor (32) and said resistor (33) of said delay means, are connected together.

16. An electronic safety interlock circuit as defined in claim 15, in which a resistance (41) is connected between said first input of said first comparator (6) and said switch (9), and in which the series combination of a third diode (42) and a resistor (43) is connected between said first input of said first comparator and ground or other reference voltage, the cathode of said third diode being connected to the resistor (43) with which it is in series and in which, further, a mode switch is provided having a selector contact connected to ground or other reference voltage and having one selectable contact thereof connected through a capacitor (44) to the cathode of said third diode and through another resistance (46) to said previously mentioned switch.

17. An electronic safety interlock circuit for a servo system as defined in claim 1, in combination with a servo system of the kind referred to in claim 1 in which said displaceable member is equipped with a hydraulic positioning device for displacement thereof.

18. A combination as defined in claim 17, in which said hydraulic positioning means are equipped with magnetic valves for control thereof, said magnetic valves having windings arranged in circuit so as to be actuatable only with the presence of an output from said output disabling means corresponding to an enabling or releasing condition of said output disabling means.

19. A combination as defined in claim 17, in which said displaceable member is an earth-working device mounted on a carriage equipped for movement over the earth surface.

* * * * *